(12) United States Patent
Chalmer et al.

(10) Patent No.: US 10,430,220 B1
(45) Date of Patent: Oct. 1, 2019

(54) VIRTUAL DEVICES AS PROTOCOL NEUTRAL COMMUNICATIONS MEDIATORS

(71) Applicant: EMC Corporation, Hopkinton, MA (US)

(72) Inventors: Steven R. Chalmer, Redwood City, CA (US); Jonathan Krasner, Coventry, RI (US); Serge Pirotte, Coventry, RI (US); Matt Fredette, Belmont, MA (US); Steven T. McClure, Northborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 89 days.

(21) Appl. No.: 14/863,608

(22) Filed: Sep. 24, 2015

(51) Int. Cl.
G06F 9/455 (2018.01)

(52) U.S. Cl.
CPC ........... *G06F 9/45558* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 9,483,290 B1* | 11/2016 | Mantri | ............... | G06F 9/45533 |
| 2012/0110571 A1* | 5/2012 | Smith | ............... | G06F 9/445 |
| | | | | 718/1 |
| 2013/0159580 A1* | 6/2013 | Dong | ............... | G06F 9/45558 |
| | | | | 710/266 |
| 2013/0339645 A1* | 12/2013 | Barve | ............... | G06F 3/065 |
| | | | | 711/162 |
| 2014/0025770 A1* | 1/2014 | Warfield | ............... | G06F 15/17331 |
| | | | | 709/213 |
| 2014/0280499 A1* | 9/2014 | Basavaiah | ............... | H04L 67/1002 |
| | | | | 709/203 |
| 2015/0020075 A1* | 1/2015 | Glew | ............... | G06F 9/4881 |
| | | | | 718/101 |
| 2015/0106489 A1* | 4/2015 | Duggirala | ............... | H04L 61/2503 |
| | | | | 709/222 |

* cited by examiner

Primary Examiner — Wynuel S Aquino
(74) Attorney, Agent, or Firm — Anderson Gorecki LLP

(57) ABSTRACT

Software emulations of physical devices allow protocol neutral communications between heterogeneous operating systems. Within a computing node of a storage cluster, a logical communications cut-through device connects a guest operating system to a front end adapter and enables the guest operating system to perform operations on an allocated portion of computing node memory without hypervisor intervention. The cut-through device may implement an industry standard memory-mapped interface, thereby enabling a guest operating system to discover the cut-through device and obtain access to memory that is shared with the hypervisor and/or another guest OS. Moreover, if guest OSs and/or the hypervisor share any communications protocol then the channel may be utilized at memory speeds. This may be advantageous in symmetric multiprocessing environments in which multiple guest OSs can have core affinities.

20 Claims, 5 Drawing Sheets

VIRTUAL DEVICES AS PROTOCOL NEUTRAL COMMUNICATIONS MEDIATORS

BACKGROUND

Aspects of this disclosure are generally related to data storage systems which can be used to maintain relatively large data sets and support a relatively large number of concurrent users. The basic building blocks of a data storage system may include computing nodes such as storage engines or storage servers. The computing nodes provide access to data storage devices such as disk drives and flash drives. A plurality of computing nodes can be interconnected in order to function together as a cluster. A plurality of clusters can be interconnected by communication links to enable the clusters to function as a single distributed storage system.

SUMMARY

All examples, aspects and features mentioned in this document can be combined in any technically possible way.

In accordance with an aspect, an apparatus comprises: a set of non-volatile back-end storage devices; and at least one computing node which manages access to the set of non-volatile back-end storage devices, the computing node comprising a front end adapter configured to communicate with an external device, at least one processor, a memory, a primary operating system, at least one guest operating system, a hypervisor that manages allocation of the processor and the memory to the guest operating system, and a logical communications cut-through device which connects the guest operating system to the front end adapter and enables the guest operating system to perform operations on an allocated portion of the memory without hypervisor intervention. In some implementations a device driver is configured for use by the guest operating system to drive the cut-through device. In some implementations a plurality of heterogeneous guest operating systems and heterogeneous device drivers are configured for use by respective ones of the guest operating systems to drive instances of the cut-through device. In some implementations the cut-through device comprises a driver configured to perform protocol translation. In some implementations the cut-through device comprises a fabric driver configured to connect the guest operating system to a remote front end adapter of another computing node. In some implementations the cut-through device comprises a logical bus, logical interface, logical chip, or combinations thereof. In some implementations the cut-through device comprises a memory-mapped interface. In some implementations the cut-through device comprises a program configured to mediate local transfer of data from the front end adapter to the memory allocated to the guest OS. In some implementations the cut-through device comprises a program configured to monitor and maintain connections between endpoints. In some implementations the processor comprises CPU cores and at least one logical core on which the guest operating system runs, and wherein both the CPU cores and the logical core have access to a portion of the memory allocated to the guest OS.

In accordance with an aspect a method comprises: in a storage cluster comprising a set of non-volatile back-end storage devices and at least one computing node which manages access to the set of non-volatile back-end storage devices, the computing node comprising a front end adapter configured to communicate with an external device, at least one processor, a memory, a primary operating system, at least one guest operating system: a hypervisor managing allocation of the processor and the memory to the guest operating system; instantiating a logical communications cut-through device which connects the guest operating system to the front end adapter; and the guest operating system performing operations on an allocated portion of the memory via the cut-through device without hypervisor intervention. In some implementations the method comprises the guest operating system driving the cut-through device with a device driver. In some implementations the method comprises instantiating a plurality of heterogeneous guest operating systems and heterogeneous device drivers configured for use by respective ones of the guest operating systems for driving instances of the cut-through device. In some implementations the method comprises performing protocol translation with the cut-through device. In some implementations the method comprises a fabric driver connecting the guest operating system to a remote front end adapter of another computing node. In some implementations the method comprises instantiating the cut-through device as a logical bus, logical interface, logical chip, or combinations thereof. In some implementations the method comprises instantiating the cut-through device with a memory-mapped interface. In some implementations the method comprises the cut-through device mediating local transfer of data from the front end adapter to the memory allocated to the guest OS. In some implementations the method comprises the cut-through device monitoring and maintaining connections between endpoints. In some implementations the processor comprises CPU cores and at least one logical core on which the guest operating system runs, and the method comprises both the CPU cores and the logical core accessing a portion of the memory allocated to the guest OS.

DETAILED DESCRIPTION

Some aspects, features and implementations may comprise computer components and computer-implemented steps or processes that will be apparent to those skilled in the art. It should be understood by one of ordinary skill in the art that the computer-implemented steps or processes may be stored as computer-executable instructions on a non-transitory computer-readable medium. Furthermore, it should be understood by one of ordinary skill in the art that the computer-executable instructions may be executed on a variety of physical processor devices. For ease of exposition, not every step, process or element is described herein as part of a computer system, but those of ordinary skill in the art will recognize steps, processes and elements that may have a corresponding computer system or software component. Such computer system and software components are therefore enabled by describing their corresponding steps, processes or elements, and are within the scope of the disclosure. When corresponding physical and non-physical elements are described herein, modifiers including but not limited to "logical," "virtual" and "emulated" are used to refer to non-physical elements and the absence of such modifiers is used to refer to corresponding physical elements. For example, a "logical device" is non-physical and a "device" is physical. It should also be understood that non-physical elements are not merely abstract concepts but rather are implemented with physical elements. For example, a logical storage device is backed by one or more physical storage devices where the logical storage device may represent a layer of abstraction between the logical device and the physical storage devices.

Figure 1:
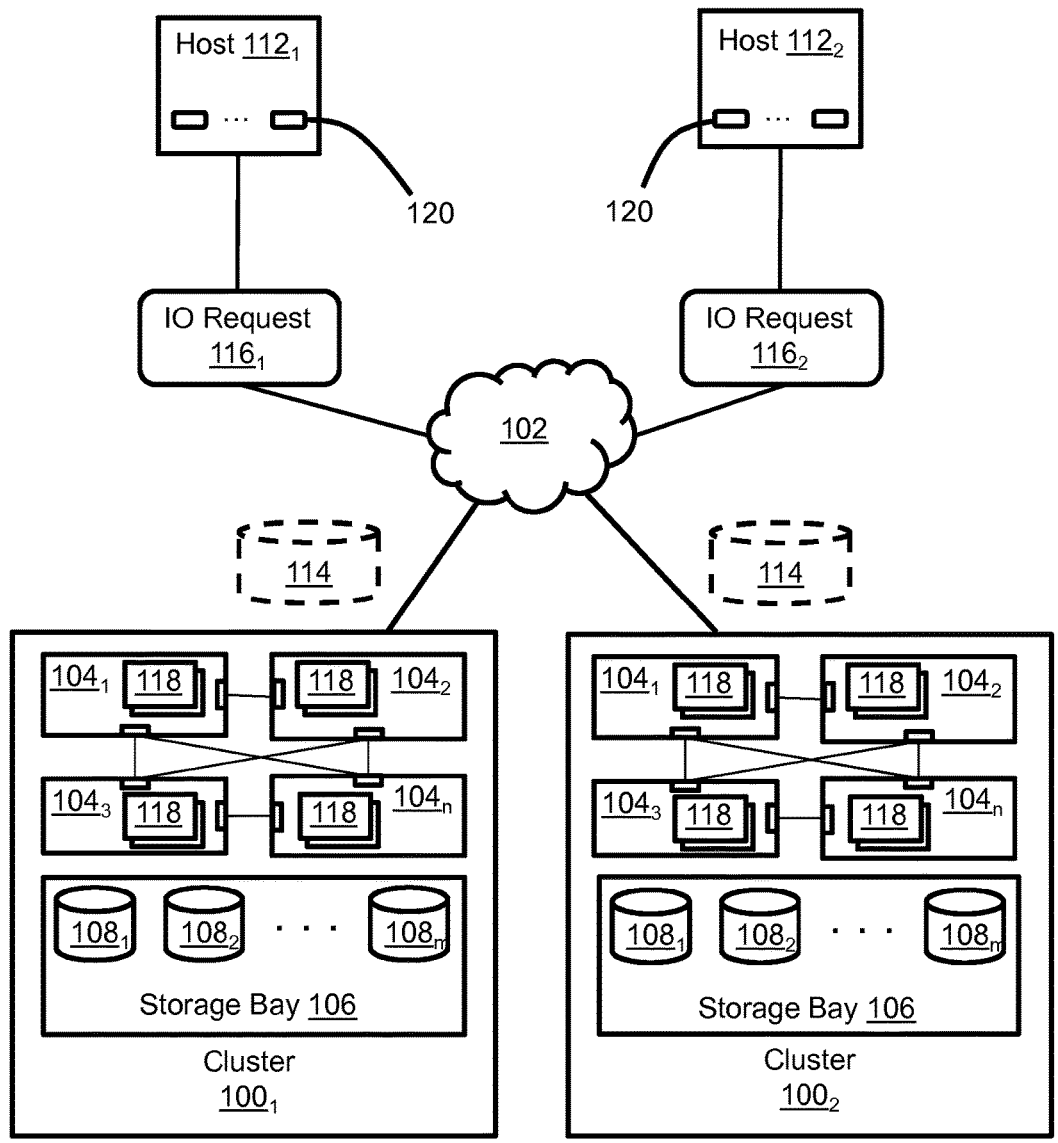
FIG. 1 illustrates a data storage system in which a CTD (cut-through device) subsystem connects a guest OS with a local or remote front end adapter, thereby enabling the guest OS to access the cluster in which it is situated as if the guest OS were running on an external host.

FIG. 1 illustrates a distributed data storage system that maintains data and supports IOs associated with a large number of concurrent users. The data storage system includes storage clusters $100_1$, $100_2$ that are interconnected via a network 102. For context and without limitation the network 102 could be a WAN (wide area network) or MAN (metropolitan area network) and each cluster could be in one or more racks or chassis. Each storage cluster $100_1$, $100_2$ includes one or more computing nodes such as storage engines $104_1$-$104_n$ or storage servers, and a storage bay 106 with multiple data storage devices $108_1$-$108_m$. The computing nodes include processors and memory, and utilize an operating system. The storage devices $108_1$-$108_m$ may include pools of different types of non-volatile data storage devices which are organized into hierarchical tiers. For example and without limitation, the data storage devices may include a storage pool of flash drives at tier 0, a storage pool of FC (Fibre Channel) drives at tier 1, and a storage pool of SATA (serial advanced technology attachment) drives at tier 2. Each storage engine is connected to every other storage engine via point-to-point links across an interconnecting fabric. Moreover, each printed circuit board "blade" in the cluster may be interconnected via the fabric. The point-to-point links provide high speed communications and support operations such as RDMA (Remote Direct Memory Access).

An external device such as a user terminal or server may use the data storage system by communicating with one of the external host devices $112_1$, $112_2$ which may be associated with the data storage system, e.g., via the network 102. Multiple external host devices may be associated with each cluster, and each host device may host any of a wide variety of applications. An exemplary external host device may be a type of server which hosts one or more instances of an application 120 such as a database, for example and without limitation, for which the corresponding data is maintained by the data storage system. A communication between the external device and the instance of the application running on one of the host devices $112_1$, $112_2$ may prompt a corresponding IO request $116_1$, $116_2$ respectively to be sent to cluster $100_1$, $100_2$ respectively by the application instance in order to read or write data. Any of the storage engines $104_1$-$104_n$ can receive and process IO requests, e.g., by writing data to the physical storage devices or reading data from the physical storage devices and sending the data to the host. The application and the external host device will typically be unaware of the actual location of data on the physical storage devices $108_1$-$108_m$. The IO requests $116_1$, $116_2$ reference one or more locations in a logical storage device 114, of which there may be a plurality, e.g. and without limitation one per hosted application. The data stored on each logical storage device may be distributed across multiple physical storage devices $108_1$-$108_m$ and possibly mirrored by each cluster, and extents of data may be moved between physical storage devices in each cluster in response to tiering decisions and other factors. Each cluster maintains directories with mappings between the logical storage device 114, cache memory, and the physical storage devices $108_1$-$108_m$. The mappings indicate which pages are in cache and where pages are located in backend storage. When data corresponding to an IO request is already in the cache, i.e., a "cache hit," then that cached copy of the data can be used to service the IO request without accessing back end storage. When the data being accessed is not already in the cache, i.e. a "cache miss," then that data is copied into the cache in order to service the IO request, e.g., copied into cache from back end storage in response to a read request. Copies may also exist on multiple storage engines.

Hosted applications 120 may alternatively or additionally be operated on guest OSs 118 (operating systems). As will be explained in greater detail below, the guest OSs utilize the processor and memory resources of the storage engines rather than the processor and memory resources of external host devices. However, the guest OSs may be different than, and independent of, the storage engine OS. In the description below the guest OS and storage engine/director OS are heterogeneous. Operating applications on guest OSs may avoid communication latency associated with the network 102.

Figure 2:
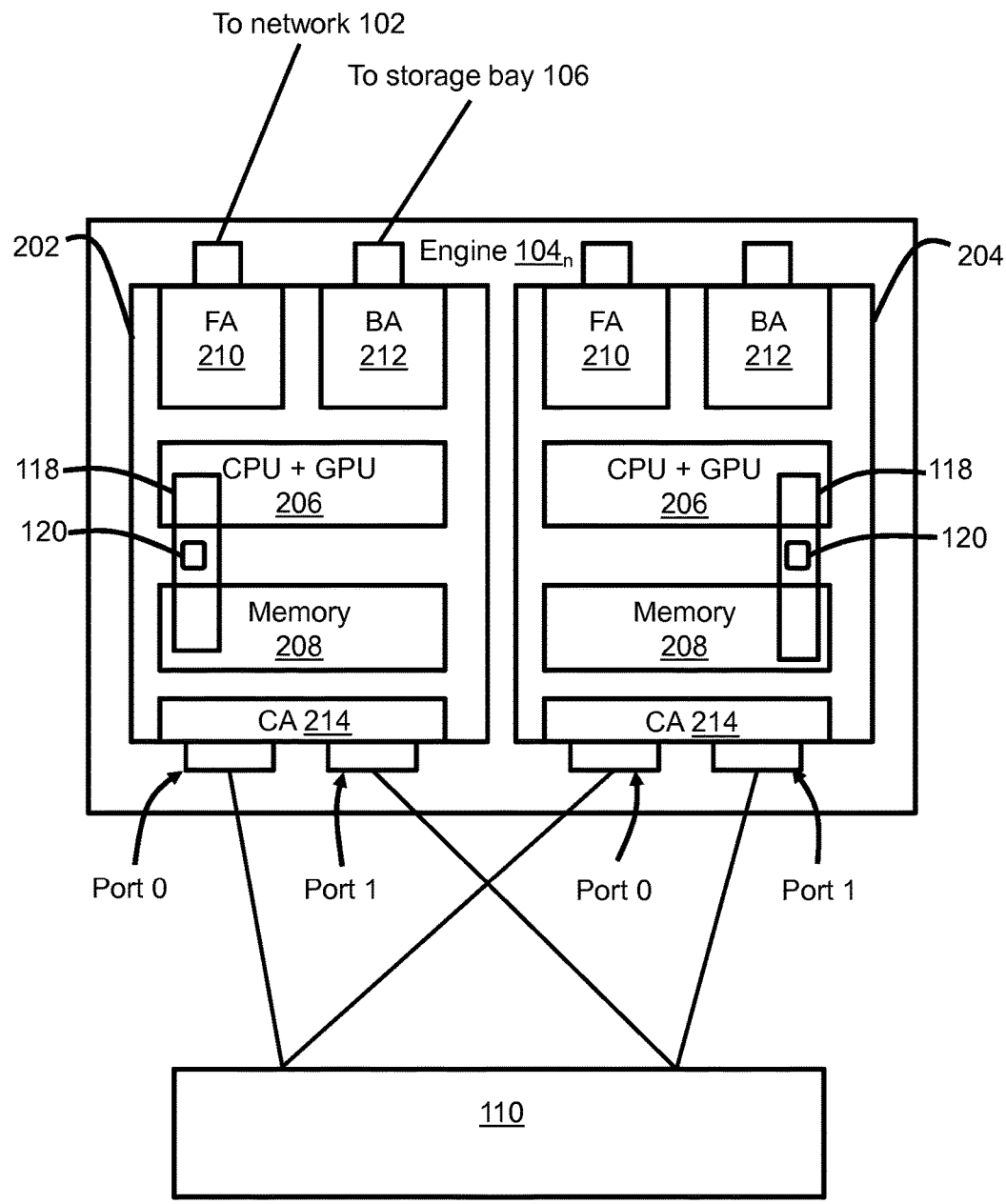
FIG. 2 illustrates a storage engine of the data storage system of FIG. 1 in greater detail.

FIG. 2 illustrates one possible implementation of a storage engine $104_n$ (FIG. 1) in greater detail. In the illustrated example the storage engine includes two storage directors 202, 204. Each storage director includes processor resources 206, a memory (cache) 208, a FA (front end adapter) 210, a BA (back end adapter) 212, and a channel adapter 214, all of which may be implemented on the same printed circuit board blade. The processor resources may include, for example and without limitation, a multi-core CPU and GPU. The memory could include, for example and without limitation, volatile memory such as RAM. Each front end adapter 210 is configured to interface with external host devices. For example, the front end adapter includes a program which presents the logical storage device, receives IO requests from external host application instances, and provides data to external hosts in response to read requests. The back end adapter 212 includes a program which interfaces with the back end physical storage devices $108_1$-$108_m$ (FIG. 1). For example, the back end adapter reads data from and writes data to the back end storage devices. The processor resources 206 run a variety of threads on an instance of the storage engine OS. The threads are configured to cause the director to perform IOs and other functions. Each channel adapter 214 includes two ports corresponding to two switches of the fabric 110 which provides redundant point-to-point connectivity between directors. The memory 208 includes a cache slots section which is allocated for temporarily storing data that is being written to or read from the back end storage devices. For example, data that is being written by a host device is initially copied to the memory 208 and subsequently destaged to the back end storage devices. Data that is being read by a host device is copied from the back end storage devices to memory 208 via the back-end adapter and then provided to the host. Data may be also copied to the memory from the back end storage devices in response to a hint.

Each director may host a plurality of different guest OSs 118 which may host applications 120. For example and without limitation, multiple instances of the same guest OS and instances of different guest OSs may be hosted. The guest OSs may be different from the OS used by the director, e.g., non-native or native but different. Each guest OS may be allocated a portion of the processor resources 206 and memory 208. Together, the allocated processor resources and memory represent a VM (virtual machine) which runs the guest OS. The allocated processor resources are used in an emulation mode to provide logical CPU cores on which the guest OS and its hosted applications run. Execution of threads associated with different guest OSs is performed by different VMs using different logical cores. A computer program such as a hypervisor manages sharing of the processor resources and memory resources among the guest OSs. In particular, the hypervisor manages operation of guest OSs which are associated with virtual host applications by sharing the processor resources and memory resources such that, from the perspective of each guest OS, the resources appear to be dedicated to that guest OS. Consequently, individual hardware platforms need not be dedicated to individual hosts, and a variety of virtual hosts may be supported by a physical host device.

Figure 3:
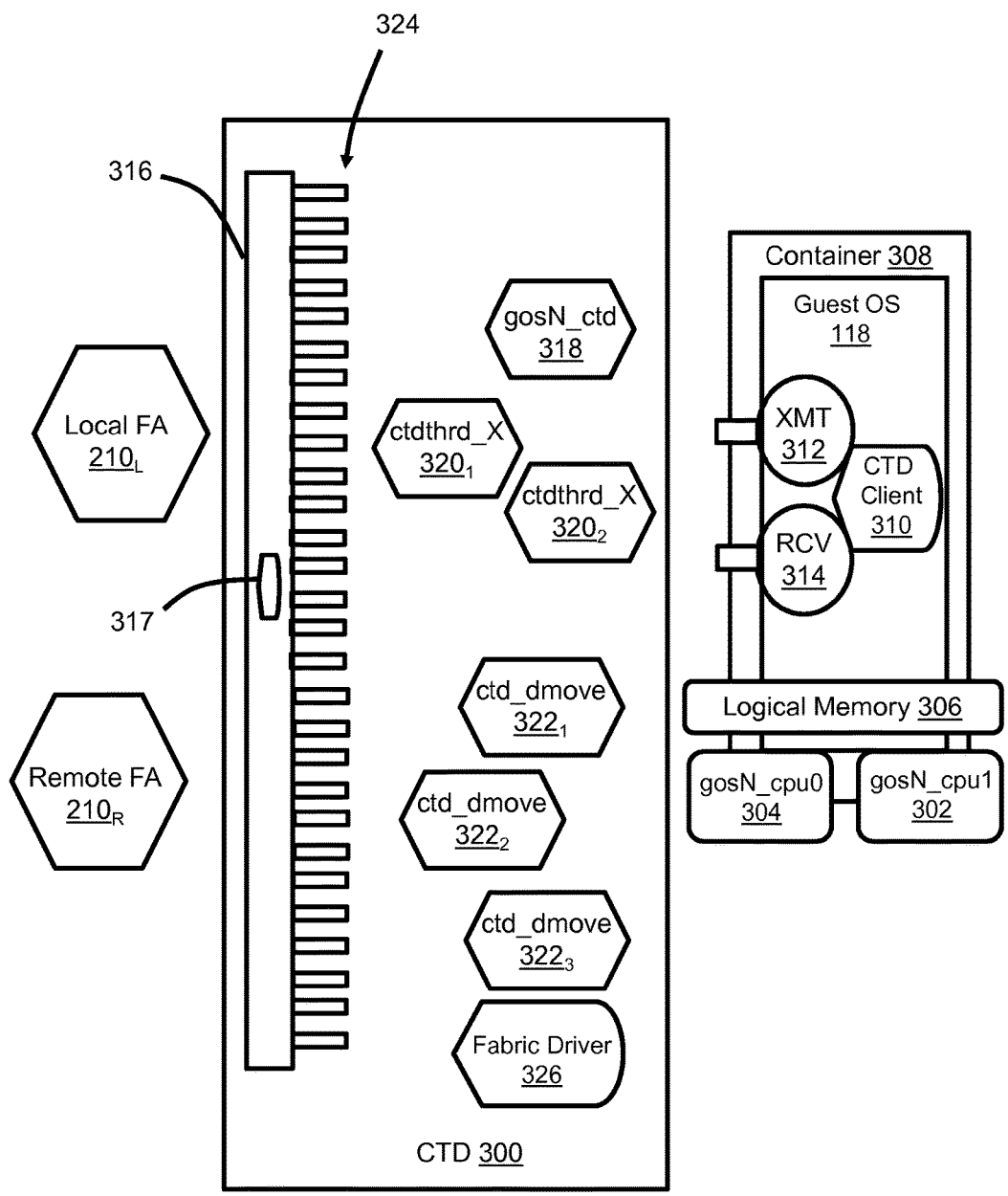
FIG. 3 illustrates an implementation of a CTD subsystem.

Referring to FIG. 3, a CTD 300 (cut-through device) subsystem connects a guest OS 118 with a local front end adapter $210_L$ or remote front end adapter $210_R$, thereby enabling the guest OS to access any director in the cluster in which it is situated as if the guest OS were running on one of the external hosts ($112_1$, $112_2$, FIG. 1). The term "CTD" is used broadly herein to include logical versions of busses, interfaces, chips, and combinations thereof. The CTD 300 has a memory-mapped interface, and instances can operate with a variety of different guest OSs. Access to the front end adapters $210_L$, $210_R$ may be provided with low latency because both the CPU cores and logical CPU cores have access to the portion of memory 208 (FIG. 2) allocated to the guest OS. A guest OS is able to discover a CTD and obtain access to memory that is shared with the hypervisor, another guest OS, or both. Participants in that memory space such as guest OSs have their own logical addresses and do not require hypervisor intervention in order to perform operations on that memory space. Moreover, if guest OSs and/or the hypervisor share any communications protocol, they may be able to utilize that channel at memory speeds.

The illustrated CTD includes a CDI (common data interface) layer 316 with a pseudo_FCP driver 317, gosN_ctd thread 318, ctdthrd_X threads $320_1$, $320_2$, and ctd_dmove threads $322_1$, $322_2$, $322_3$. The pseudo_FCP_Driver 317 is used by the CDI layer 316 as the call-back interface between the ctdthrd_X threads and CDI guest ports 324 associated with the pseudo_FCP_Driver. The pseudo_FCP_Driver handles protocol translations and response messages from the CDI layer for the CTD subsystem. The gosN_ctd 318 is a daemon thread that is started when the container 300 is instructed to boot the guest OS 118. The thread monitors and maintains connections between various endpoints in the CTD subsystem, where an endpoint is either a CTD or a guest port associated with the CDI layer. There is one gosN_ctd 318 thread associated with each CTD 300. Each ctdthrd_X thread $320_1$, $320_2$ is a daemon used by the CTD subsystem to mediate the transfer of data from the front end adapters to the guest OS memory space 306. There are two ctdthrd_X threads per CTD using a port that is configured for the CTD subsystem. Each ctd_dmove thread $322_1$, $322_2$, $322_3$ is a daemon used to mediate the local transfer of data from the front end adapter to the guest OS memory space when the guest OS, front end adapter and global memory cache slots are all on the same board. A fabric driver 326 mediates transfers of data from off-board memory. A container 308, which is associated with the hypervisor, manages guest OS 118 access to processor resources and memory resources. For example, the container prevents the guest OS from discovering and utilizing the processor resources and memory resources which are not allocated to the guest OS. The container is thus analogous to the VM on which the guest OS runs using logical processor cores gosN_cpu1 302 and gosN_cpu0 304 and logical memory space 306.

In one example the CTD 300 is a virtual PCI (peripheral component interconnect) device that provides Fibre Channel connectivity between the guest OS 118 and front end adapters $210_L$, $210_R$. However, although the illustrated example uses the PCI specification as the emulated hardware device interface for obtaining memory information, any standard or non-standard specification that includes a discovery phase might be used, including but not limited to USB, SCSI, Infiniband, Ethernet, and any of a wide variety of other technologies either alone or in combination. From the perspective of the guest OS 118 with which it is associated the CTD 300 appears to be a standard physical communications device, e.g. and without limitation, a PCI bus. The CTD has an I/O space mapped set of registers that are programmed in a standard manner to provide memory space that is mapped to the guest OS, along with other registers that are used to monitor and control the device. From the perspective of the director's OS the CTD appears as an API set that can be utilized by the various daemon thread components of the CTD. A CTD client driver 310 associated with XMT and RCV ring buffers 312, 314 in the guest OS memory 306 is used by the guest OS to drive the CTD 300. A separate CTD client driver may be provided for each type of guest OS. The CTD Client driver appears as a standard device driver, e.g. and without limitation a SCSI device driver, to higher levels in the guest OS. The CTD client driver wraps SCSI CDBs (small computer system interface command descriptor blocks) into CTD Protocol messages for transport.

In an exemplary local data transfer the guest OS 118 uses the CTD 300 as a SCSI initiator with a CDI Guest port 324 as the SCSI target device. A local data transfer is one in which the associated volume is mapped to the FA hosting the guest OS (i.e., the local FA 210L), and the cache slot for the volume being accessed is also on the same board as that FA. The CDI maintains several different sets of ports to connect to both physical and virtual devices within the cluster. CDI physical ports are used for hardware devices. CDI virtual ports are used for virtual back-end (VBE) devices. CDI Guest ports 324 are used for the purposes of handling guest OS CTDs. The guest OS 118 places a CTD protocol message on the transmit ring buffer 312. The message is serviced by a pseudo_FCP_Driver call from the CDI layer 316. The CTD_FCP_Driver keeps an internal record of the request marked as active, formats the CTD protocol message into an I/O vector structure used for CDI communications, and places that structure into a CDI Guest port queue. The CDI responds by placing a message into the output queue monitored by the ctdthrd_X thread. One of the ctd_dmove threads moves any data associated with that message from the memory in which it was placed by the FA into the guest OS memory buffers that were indicated as available in the original request. When the CDI message indicates that the data transfers are complete, a pseudo_FCP_Driver call is used to place a CTD response message onto the receive ring 314. The Guest CTD driver removes the response from the receive ring of the CTD and completes the transaction.

Transfers involving volumes that are mapped to FAs which are not local to the guest OS are mediated via the fabric 110 (FIG. 2) which interconnects the storage engines. Data may be transferred between the remote memory and the guest OS memory directly through the fabric driver 326.

Figure 4:
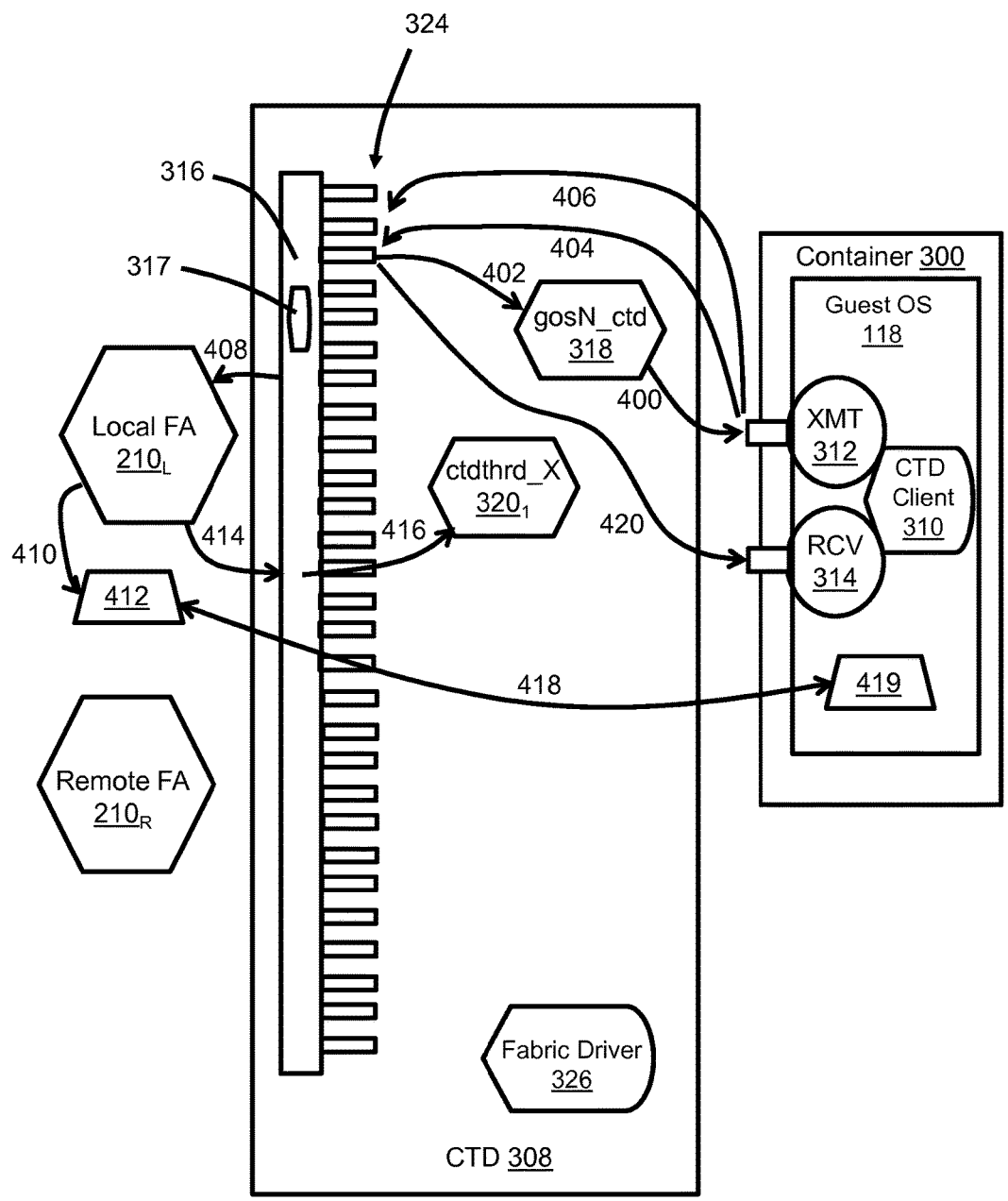
FIG. 4 illustrates operation of the CTD subsystem when accessing a local front end adapter.

FIG. 4 illustrates operation of the CTD subsystem accessing the local front end adapter $210_L$. As indicated at 400, the gosN_ctd 318 thread is started at guest OS 118 boot time and initializes a GuestOS device channel. The gosN_ctd thread enqueues a MEMORY message and a DETECT message for eventual transmission on that channel. When the CTD Client 310 initializes, it resets the CTD 300 by writing to a reset register, then enqueues a DETECT message to inform the gosN_ctd thread that it is now active. As indicated at 402, the CDI layer 316 attaches to new channels using the pseudo_FCP_Driver 317 and a gos_ctd_channels attach( ) CTD API call. When it finds a new channel, it sends a DETECT message via a CTD API call ctd_fcp_check_link_state( ), then begins polling for messages on that channel through a normal pseudo_FCP_Driver read call. As indicated at 404, the CDI layer receives the MEMORY and DETECT messages from the initialized GuestOS channel. These were not transmitted by the CTD Client but were enqueued for transmission by the gosN_ctd thread when the channel was initialized. The name in the DETECT message and the memory address in the MEMORY message are stored for future communications on that channel in the CDI GuestOS port structure. As indicated at 406, the CDI layer receives a SCSI_COMMAND message. The pseudo_FCP_Driver is used to translate this to an I/O vector type used by the CDI, and enqueue it to the CDI GuestOS Port associated with the channel. As indicated at 408, the local FA $210_L$ thread receives this message from the CDI layer and carries out the request. As indicated at 410, for read or write operations, this results in an emulation memory buffer 412 being assigned to handle the data transfer. As indicated at 414, the local FA calls the CDI layer to indicate that the data (or data area) is available. As indicated at 416, The CDI layer invokes the call-back function associated with the original request. As indicated at 418, the ctdthrd_0 thread then mediates the data transfer to a guest buffer 419 according to the direction of the original request. As indicated at 420, the CDI layer then formats a RESPONSE CTD packet and enqueues it to the RCV ring 314 of the GuestOS using a pseudo_FCP_Driver write call. The CTD Client 310 dequeues the RESPONSE packet, unwraps the SCSI response, and notifies the guest OS SCSI stack.

When the SCSI_COMMAND message is associated with a CDI GuestOS Port that is associated with the remote FA $210_R$, then actions 408, 410, 414, 416, and 418 are skipped. Instead, the CDI layer 316 issues calls to the network fabric layer 110 (FIG. 2) using fabric driver 326 to transfer that data using the guest OS memory in the direction associated with the request.

Figure 5:
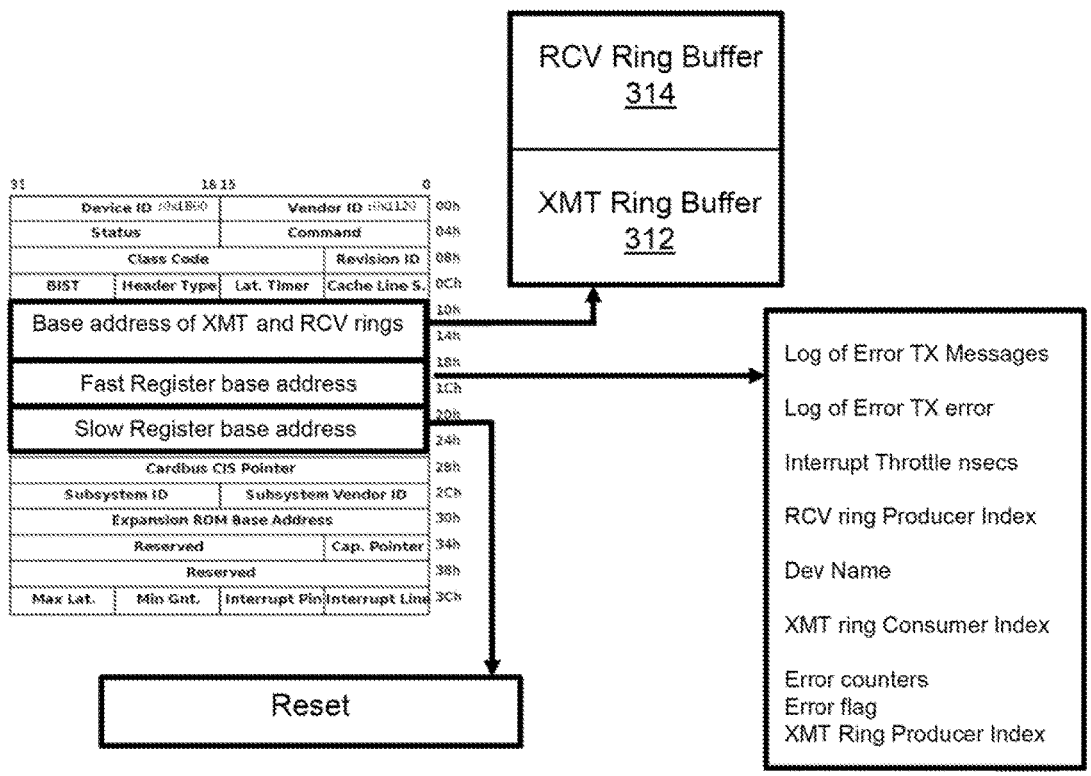
FIG. 5 illustrates CTD PCI registers.

FIG. 5 illustrates an implementation of CTD PCI registers. There are two fast registers associated with the transmit ring buffer 312. A transmit ring producer index (TPI) is the index of the next message in the transmit ring that the guest will write. A transmit ring consumer index (TCI) is the index of the next message in the transmit ring that the device will read. If (TPI+1) mod RINGSIZE≠TCI, then the transmit ring is not full. To transmit a message, the guest writes it at index TPI in the transmit ring, then does TPI=(TPI+1) mod RINGSIZE. There are also two fast registers associated with the receive ring 314. A receive ring producer index (RPI) is the index of the next message in the receive ring that the device will write. A receive ring consumer index (RCI) is the index of the next message in the receive ring that the CTD Client will read. If RCI≠RPI, then the receive ring is not empty. To receive a message, the CTD Client reads it from index RCI in the receive ring, then does RCI=(RCI+1) mod RINGSIZE.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
a set of non-volatile back-end storage devices; and
at least one computing node that manages access to the set of non-volatile back-end storage devices, the computing node comprising:
a front-end adapter configured to communicate with an external device;
at least one processor;
a memory;
a primary operating system;
at least one guest operating system;
a hypervisor that manages allocation of the processor and the memory to the guest operating system; and
a logical communications device that is discoverable and discovered by the guest operating system as a communications device and transmits communications between the guest operating system and the front-end adapter, the logical communications device comprising a memory space that is mapped to the guest operating system and a client driver that wraps small computer system interface command descriptor blocks into protocol messages that are transmitted between the guest operating system and the front-end adapter without hypervisor intervention.

2. The apparatus of claim 1 comprising a device driver configured for use by the guest operating system to drive the logical communications device.

3. The apparatus of claim 2 comprising a plurality of heterogeneous guest operating systems and heterogeneous device drivers configured for use by respective ones of the guest operating systems to drive the logical communications device.

4. The apparatus of claim 1 wherein the logical communications device comprises a driver configured to perform protocol translation.

5. The apparatus of claim 1 wherein the logical communications device comprises a fabric driver configured to connect the guest operating system to a remote front-end adapter of another computing node.

6. The apparatus of claim 1 wherein the logical communications device comprises a logical bus, logical interface, logical chip, or combinations thereof.

7. The apparatus of claim 1 wherein the logical communications device comprises a memory-mapped interface.

8. The apparatus of claim 1 wherein the logical communications device comprises a program configured to mediate local transfer of data from the front-end adapter to the memory allocated to the guest OS.

9. The apparatus of claim 1 wherein the logical communications device comprises a program configured to monitor and maintain connections between endpoints.

10. The apparatus of claim 1 wherein the processor comprises CPU cores and at least one logical core on which the guest operating system runs, and wherein both the CPU cores and the logical core have access to a portion of the memory allocated to the guest OS.

11. A method comprising:
in a storage cluster comprising a set of non-volatile back-end storage devices and at least one computing node that manages access to the set of non-volatile back-end storage devices, the computing node comprising a front-end adapter configured to communicate with an external device, at least one processor, a memory, a primary operating system, and at least one guest operating system:
a hypervisor managing allocation of the processor and the memory to the guest operating system;
the guest operating system discovering a logical communications device as a communications device, the logical communications device comprising a client driver and a memory space that is mapped to the guest operating system; and
the logical communications device wrapping small computer system interface command descriptor blocks into protocol messages and transmitting the protocol messages between the memory space and the front-end adapter without hypervisor intervention.

12. The method of claim 11 comprising the guest operating system driving the logical communications device with a device driver.

13. The method of claim 12 comprising instantiating a plurality of heterogeneous guest operating systems and heterogeneous device drivers configured for use by respective ones of the guest operating systems for driving the logical communications device.

14. The method of claim 11 comprising performing protocol translation with the logical communications device.

15. The method of claim 11 comprising a fabric driver connecting the guest operating system to a remote front-end adapter of another computing node.

16. The method of claim 11 comprising instantiating the logical communications device as a logical bus, logical interface, logical chip, or combinations thereof.

17. The method of claim 11 comprising instantiating the logical communications device with a memory-mapped interface.

18. The method of claim 11 comprising the logical communications device mediating local transfer of data from the front-end adapter to the memory allocated to the guest OS.

19. The method of claim 11 comprising the logical communications device monitoring and maintaining connections between endpoints.

20. The method of claim 11 wherein the processor comprises CPU cores and at least one logical core on which the guest operating system runs, and comprising both the CPU cores and the logical core accessing a portion of the memory allocated to the guest OS.

* * * * *